Patented Jan. 27, 1931

1,790,177

UNITED STATES PATENT OFFICE

SHELLEY M. STOODY, OF WHITTIER, CALIFORNIA, ASSIGNOR TO STOODY COMPANY, OF WHITTIER, CALIFORNIA, A CORPORATION OF CALIFORNIA

TOUGH STABLE-SURFACE ALLOY STEEL

No Drawing.   Application filed November 14, 1928. Serial No. 319,442.

My invention relates to a steel alloy having great hardness and toughness and also a stable surface quality, being acid, heat and abrasion resisting.

In particular the invention relates to a steel alloy containing carbon, chromium, silicon, nickel and iron.

Steel alloys containing the elements just mentioned are well known in the art and the functions of carbon, chromium, silicon, nickel in producing hardness, toughness and surface stability are well known. For instance, steel alloy containing .3% of carbon and 20% of chromium, 3.5% silicon and 30% nickel with the principal part of the remainder consisting of iron, has been used for ball bearings, balls, shafts, cutlery and the like, rifle barrels, automobile valves and other articles requiring heat resisting material and electrical resistance elements. In such steel alloys known to me the chromium percentage has not exceeded 25%. I have discovered that by increasing the chromium content from 25% to 35% with the preferred percentage of about 30% a superior steel alloy is produced which is not only suitable for cutlery of all kinds and especially dental and laboratory instruments but is peculiarly adapted for tool steel and welding rods. Welding rods made of the steel alloy containing more than 25% of chromium in conjunction with the other elements mentioned, are especially adapted for forming a setting or holder for exceedingly hard tungsten and other alloys used in cutting, boring and drilling tools, especially for drilling well holes. It has been found that the ordinary steel welding rod used for such purpose under the influence of gases given off by the pieces of tungsten or other cutting alloys form blow holes, in the weld in which said pieces are embedded. The welding rod made in accordance with this invention flows freely and forms an excellent holder or setting without blow holes produced by the tungsten and other cutting alloyed materials embedded therein.

My invention consists in the alloy formed as hereinafter described and claimed.

The preferred composition of my steel alloy is as follows:

| | Per cent |
|---|---|
| Carbon | 2 |
| Chromium | 31.75 |
| Nickel | 10 |
| Silicon | 4.75 |

With the balance (principally iron) 51.50 with or without the usual impurities, within limits, or alloying elements. The carbon content may range however, from 1% to 4%, chromium 25% to 35%, nickel 5% to 15%, silicon 3½% to 8% with the remainder consisting principally of iron which may include other alloys, the principal feature being that the chromium is in excess of 25%. Good results are obtained within the limits just given although the best results are obtained by using the preferred proportions as stated. When the steel alloy is to be used for tool steel and welding rods the carbon content is preferably raised to 3½% up to 4%.

In using the steel alloy as a welding rod the cutting or drilling tool is faced by a deposit of the molten alloy from the welding rod and pieces of very hard and heat resisting tungsten alloys and the like are embedded in the deposit. The welding rod flows freely and it forms a setting for the pieces of tungsten alloy and the like and is free from blow holes. As stated before, the steel alloy produced is very hard, having a hardness of 40 to 45 C. scale of the Rockwell testing machine besides having a high resistance against acid, heat and abrasion. The melting point is from 2700 to 3000 degrees F.

I claim:

1. An alloy steel containing carbon about 1% to about 4%, chromium from about 25% to about 35%, nickel from about 5% to about 15%, silicon from about 3½% to about 8% and the principal portion of the remainder iron.

2. An alloy steel containing carbon about 2%, chromium about 31.35%, nickel about 10%, silicon about 4.75% and the principal portion of the remainder iron.

3. A welding rod containing chromium from 25 to 35%, silicon from 3½ to 8%, nickel from 5% to 15%, carbon and iron.

4. A welding rod containing about 31.35% chromium, about 10% nickel, about 4.75% silicon, carbon and iron.

In testimony whereof I have signed my name to this specification.

SHELLEY M. STOODY.